Figure 1:
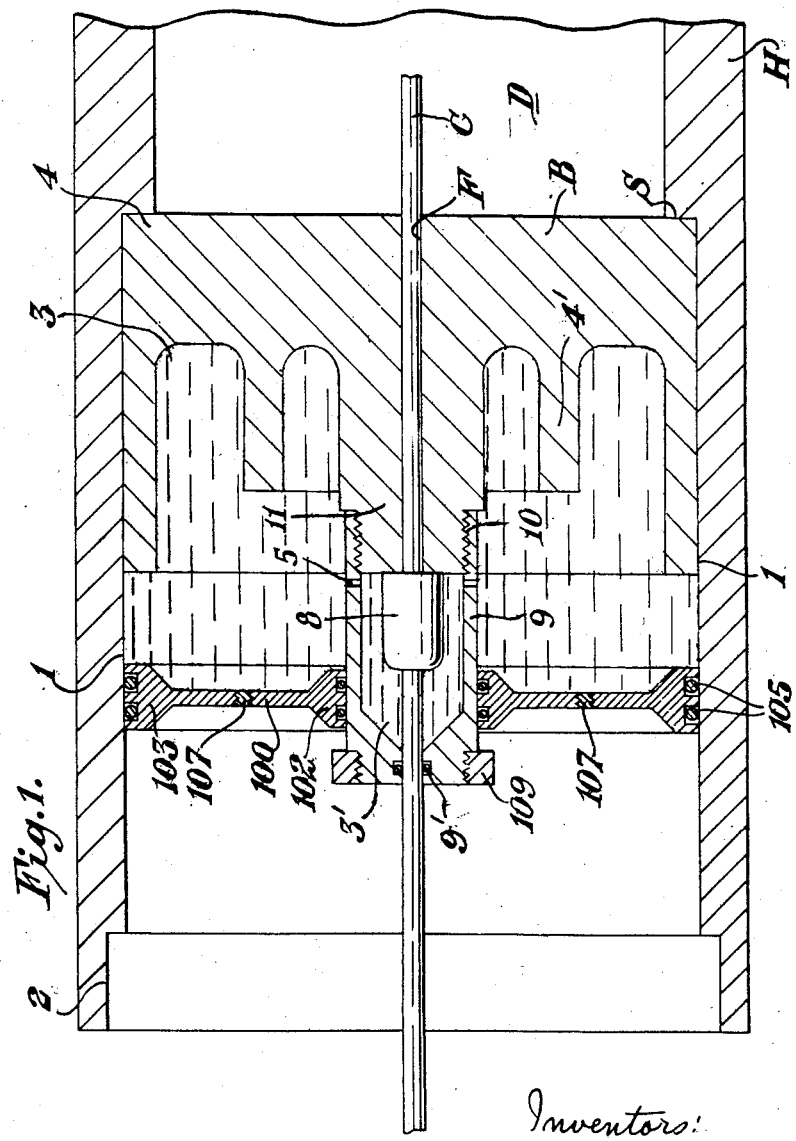

May 12, 1959    B. S. BURNETT ET AL    2,886,626
WATER-TIGHT CABLE ENTRY
Filed March 5, 1956      5 Sheets-Sheet 3
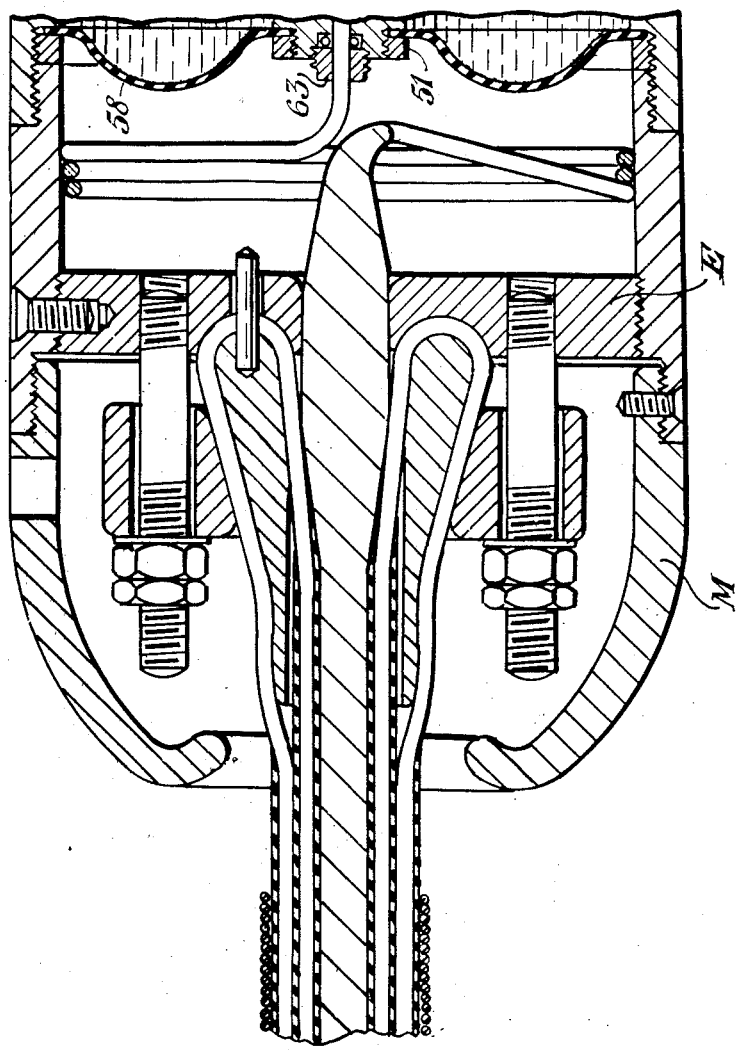
Inventors:
Barrie Shaw-Burnett
and
George Frederick Taylor
By their attorneys:
Baldwin & Wight May 12, 1959   B. S. BURNETT ET AL   2,886,626
WATER-TIGHT CABLE ENTRY
Filed March 5, 1956   5 Sheets-Sheet 5

Inventors:
Barrie Shaw Burnett
and
George Frederick Taylor
By their attorneys:
Baldwin & Wight United States Patent Office 2,886,626
Patented May 12, 1959

2,886,626

WATER-TIGHT CABLE ENTRY

Barrie Shaw Burnett, Catford, London, and George Frederick Taylor, Belvedere, England, assignors to Submarine Cables Limited, London, England, a company of Great Britain Application March 5, 1956, Serial No. 569,455

Claims priority, application Great Britain March 8, 1955

4 Claims. (Cl. 174—18)

This invention relates to an improved water-tight cable entry for use in a repeater or other water-tight container such as used in a submarine cable.

In such cable entries it is desirable to encase the entry gland for the insulated conductor in a mass of water repellent grease, which mass in service conditions is subjected to the external hydrostatic pressure in order to prevent water seeping through the cable entry.

The present invention has for its object to provide means by which the pressures on opposite sides of the grease barrier, i.e. within the chambers at each end of the repeater housing containing the water repellent grease, remain balanced with the external hydrostatic pressure.

This object may be achieved, according to the present invention, by enclosing the cable entry gland in a water-tight chamber, provided within the casing of the repeater housing, the closure to which is provided by or comprises a pressure responsive element or elements.

In one form the cable entry gland is encased in a cylindrical water-tight chamber, the chamber being closed at one end in water-tight manner by a piston which may be displaced along the cylinder so as to balance the pressure in the chamber with the external pressure.

Preferably the chamber contains an inner coaxial cylindrical chamber which surrounds the gland, there being a vent for balancing the pressures in the two chambers, the piston being annular and slidable in water-tight manner along the outer surface of the inner coaxial cylinder.

In order to avoid any risk that the piston might become displaced, instead of a single piston there is preferably provided a plurality of plungers or other pressure responsive elements, each capable of individual displacement in order to balance the pressure within the chamber with the external pressure. This has the further advantage that should there be jamming of an individual plunger the remainder will remain capable of functioning.

In this embodiment of the invention the chamber within the repeater casing, which is preferably cylindrical, may be closed at its outer end by an end plate in which is provided a series of circumferentially spaced plunger elements capable of displacement in recesses formed in the end plate. In one such arrangement the plunger elements are of annular construction and slidable in a water-tight manner along cylinders which are separately formed in the end plate, means being provided for balancing the pressure in the central inner gland chamber with the pressure in the main chamber.

According to a further feature of the invention the pressure responsive means comprises, or is formed of, a diaphragm, formed of rubber or metal. A thin copper sheet is suitable for this purpose.

Alternatively we may make use of a composite diaphragm of metal and plastic sheet, e.g. woven or sheet metal diaphragms interleaved with natural or synthetic rubber or a plastic. The several layers may be bonded or pressed together.

In one method of carrying out this further feature of the invention there is secured within the open end of the casing, cut off by each bulkhead, a flexible diaphragm, the diaphragm being sealed to the bore of the outer casing thus protecting the cable entry gland and the joint between the bulkhead and the casing.

In a second method the water repellent grease which surrounds the cable entry gland within the inner cylindrical chamber is enclosed in a container which is flexible and formed of e.g. natural or synthetic rubber, which pressurizes the water repellent grease to balance the internal and external pressures of the flexible container and also prevent water diffusion through the gland.

It has been found that some of the preferred types of water repellent greases are detrimental to the insulating material used in the cable and in the gland. Consequently two types of grease may be used in conjunction, one non-detrimental type being used in the immediate vicinity of the gland and the other as the main sealing mass. By means of the preferred arrangement of the cable entry it is possible to use two types of water repellent greases, one, which does not affect the insulant, the inner chamber in direct contact with the gland and the other in the outer chamber, the pressures being equalised by the means referred to above which also prevents the grease in the outer chamber entering the inner chamber.

Figure 2:
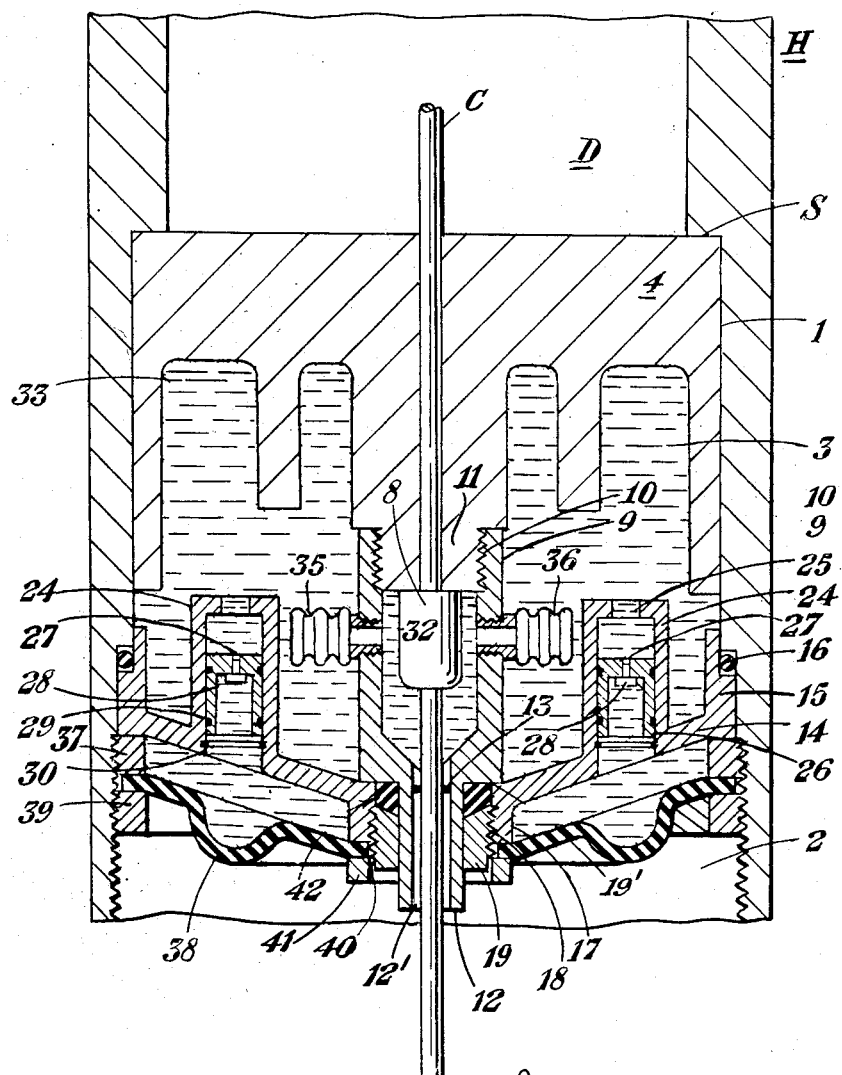
Figure 3:
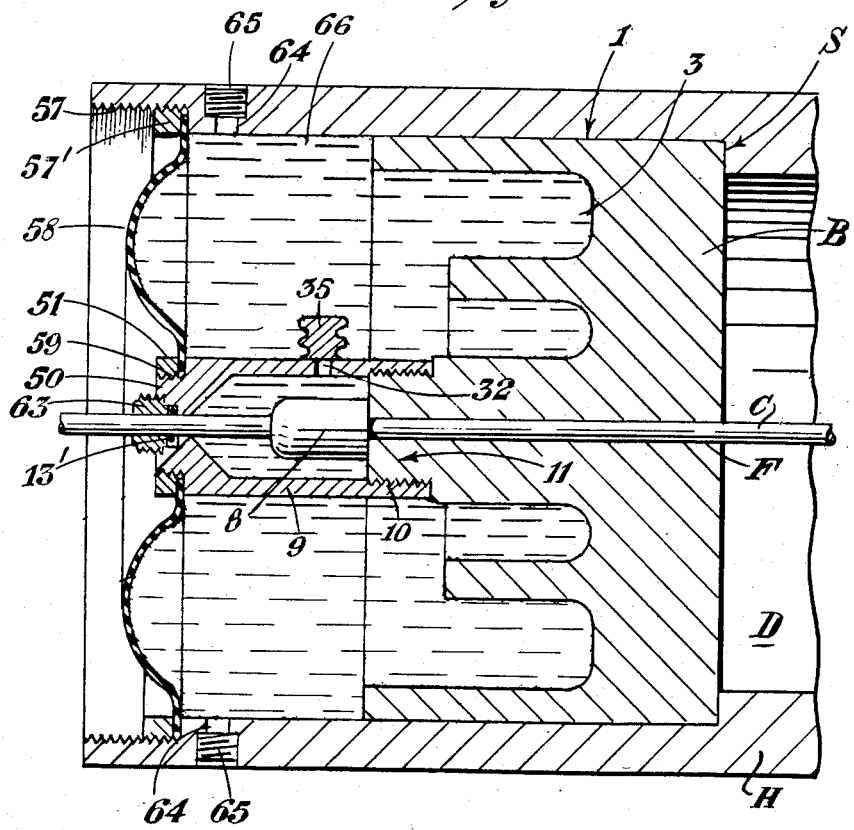
Figure 4:
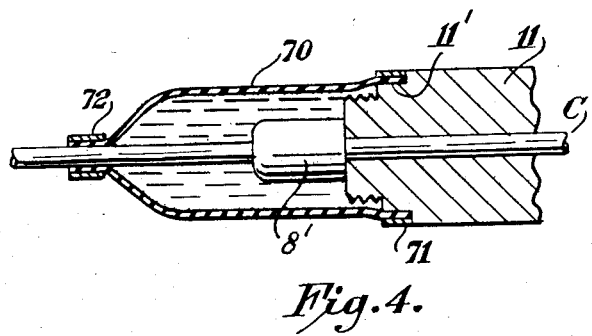
Figure 5:
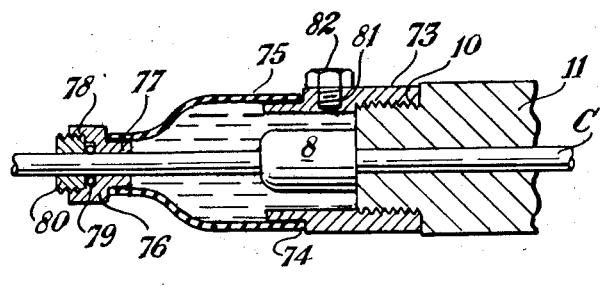
Figure 6:
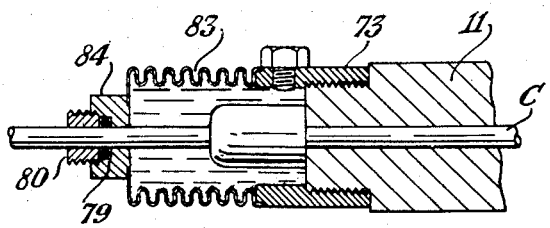

The invention is illustrated in the accompanying drawings as applied to a cable entry gland to a repeater in a submarine cable repeater housing in which:

Figure 1 is a longitudinal sectional view showing one end of the repeater housing fitted with a cable entry gland in accordance with the invention, Figure 2 is a sectional view similar to Figure 1 showing one end of the repeater housing including the bulkhead having a cable entry gland in accordance with the invention and wherein the pressure responsive means consists of a series of piston elements, Figures 3A and 3B are sectional views showing another embodiment of the invention, in which the pressure responsive means consists of a flexible diaphragm, Figures 4, 5 and 6 are detail sectional views of a modification, in which the inner chamber enclosing the cable entry gland comprises, or is formed in part by, a pressure responsive membrane.

In the drawings, C indicates the central insulated conductor or core of the submarine cable, H being the repeater housing structure casing which is in the form of a cylindrical casing and is usually formed of steel.

At each end of the repeater housing H is a counterbore forming a shoulder S to receive a bulkhead B providing an end wall of a central or interior chamber D located between the two bulkheads B, within which chamber D the repeater apparatus (not shown) is housed or received. The bulkhead B, it will be understood, is machined accurately to fit the counterbore 1 and at the outer end of the casing is a second counterbore 2 to receive an end plate E (see Figure 3A) which carries the usual armour-anchoring means. M indicates the outer end cap. Extending centrally through the bulkhead B is an axial passage or aperture F through which the cable core passes for connection within the chamber D to the repeater apparatus (not shown). Moulded on to the insulation of the cable core C is the cable entry gland, indicated generally at 8, this being in accordance with known methods.

In the cable entry gland of this invention, the gland 8 is preferably enclosed within an inner cylinder provided by a cap element 9.

For this purpose the bulkhead B may be formed with a central spigot 11 which is screwed as at 10 to receive the cap element 9, the latter having a diameter greater than that of the gland 8, so as to provide an inner and central chamber surrounding the gland, and which, as hereinafter described, is filled with a water-repellent grease. The bulkhead B may be formed with an extended circumferential wall 4 together with interior reinforcing ribs 4' so as to provide an outer water-tight or pressure chamber 3, hereinafter termed the "main" or "outer" chamber, in which chamber is the main sealing mass of water-repellent grease, the purpose of which is to prevent water seeping through the cable entry and past the gland 8 into the chamber D containing the repeater apparatus.

Referring now to Figure 1 the cable core at its entry to the cap element 9 is sealed by an O-ring 9'. Vent holes 5 in the wall of the cap element 9 provide connections between the inner chamber 3' and the main chamber 3.

In accordance with the invention, the outer chamber 3 is closed at its open end by means of a pressure responsive closure element consisting of a single piston 100. This piston 100 is formed as an annular plate and has its inner and outer perimeters of increased depth in an axial direction, as indicated respectively at 102, 103, the outer perimeter 103 making sliding contact with the inner surface of the counterbore 1, while the central bore of the piston, as provided by surface 102, is a sliding fit on the external coaxial cylindrical surface of the cap element 9.

The counterbore 1 and the external surface of the cap element 9 are machined to very close limits and with the addition of O-rings 105 the piston 100 seals off in watertight manner the outer end of the pressure chamber 3. A collar 109 on the outer end of the cylinder limits the outer travel of the piston 100. Vents 107 in the piston to enable the sealed off part of the main chamber 3 to be filled with water repellent grease, these vents being sealed after the filling operation by screw-threaded plugs.

The grease filling the chamber 3 sealed by piston 100 may be a silicone grease or a polyisobutylene but since some of the most suitable materials are harmful to polyethylene, which is commonly used for the gland 8 and the dielectric of the cable core C, a different material, harmless to polyethylene, is then used to fill the inner cylinder 9. The filling may, of course, consist entirely of a material which is not detrimental to the polyethylene.

In practice, the inner gland chamber within the cylinder 9 may be packed with a suitable water repellent material, e.g. through a filling hole after it is screwed on to the boss 11, any excess material being exuded through the vents 5. When the piston 100 is in position, the sealed-off outer end of the chamber 3 is filled with a suitable water repellent grease through vents 107. Care is taken to ensure that all the air is bled out and sufficient grease is introduced to create a pressure within the sealed off outer chamber 3.

When the repeater is lowered to the sea bed, sea water, which is free to pass through the end plate, enters the outer end of the counterbore 1 where it exerts pressure on the outer face of piston 100. Under this pressure the piston moves down the chamber 3 until the pressures on its opposite faces are balanced. As a result the external hydrostatic pressure is transmitted through the piston 100 to the grease in chamber 3 and through vents 5 to the grease in the inner cylinder 9. The pressure transmitted through the grease forces the gland 8 toward the bulkhead so as to press the inwardly facing seating surface or face of the gland against the bulkhead part 11, thereby improving the seal between the gland and the bulkhead.

In this way there is provided in each end of the repeater casing a barrier chamber containing water repellent grease at the same pressure as the surrounding sea water, which prevents water coming into contact with the gland or with the seal between the bulkhead and the casing, the barrier chamber being closed at one end by a pressure responsive means consisting of the piston element 100 which operates to balance pressure within the chamber with the pressure outside.

Referring now to Figure 2 there is shown a preferred form of the invention where in place of a single annular piston 100 there are provided a number of circumferentially spaced plunger elements.

As in the construction shown in Figure 1 the cable entry gland is enclosed within a cap element 9, the interior of which is similarly filled with water-repellent grease. In this embodiment of the invention the cap element 9 is formed with an axial extension 12, in which is an opening 12' for the passage of the core C, an O-ring 13 being provided at this point to form a seal. The main or outer chamber 3, provided by the counterbore 2, is closed at its open end by an end plate 14, this plate being formed with a peripheral flange 15 which is shouldered and accurately machined to fit the counterbore 1. It is sealed to the casing 1 by an O-ring 16.

The end plate 14 is of conical formation and has a central hollow spigot 17 providing an opening for the extension 12 of the cap element. The opening is screwthreaded as at 18 to receive a closing plug 19. On the inside face of the end plate 14 is an annular seating 19' by which it is located in an axial direction against the end of the cap element 9.

In the end plate 14 are a series of circumferentially spaced, axially extending, recesses constructed in the form of cylinders 24, these cylinders being provided at their inner ends with openings 25 giving access to the chamber 3. Slidably mounted within each of the cylinders 24 is a pressure responsive element consisting of a plunger 26, these plungers 26 having central bleed holes 27 which are sealed with headed pins or plugs 28. Likewise the plungers 26 are sealed in a water-tight manner to the cylinders 24 by O rings 29 and they are held in position within their respective cylinders by circlips 30.

As will hereinafter be explained, the interior space within the cylindrical chamber 3 divided off by the end plate 14, is filled with a water repellent grease, indicated at 33, and similarly the annular space within the cap element 9 is charged with water repellent grease which may be of the same or of a different type.

In order to provide a balance between the interior of the cap element 9 and the exterior thereof, balance pressure holes 32, similar to the vents 5 (Figure 1) are provided. Since certain types of water repellent grease are detrimental to the insulating material used in the cable and for the gland 8, it may for this reason be necessary to use one type of grease within the cap element 9 and a second type of grease in the space 33. For this purpose provision is made to prevent direct contact of the two greases, access to the holes 32 being prevented by bellows 35 which are fitted to screwed spigot pieces 36 adapted to screw into the holes 32.

The end plate 14 is secured in position by a screwed annular retaining ring 37. This retaining ring 37 provides a seating for a flexible cover or closure disc 38 which is formed of rubber or plastic and secured around its perimeter by a second ring 39. The cover disc 38 has a central opening 40 which is seated against the end of the spigot 17 and secured in position in a water-tight manner by a clamping ring 41 which is shouldered to engage the cover disc. The clamping ring may be held in place by set screws. 42 is a gasket, of resilient material.

During assembly of the cable entry gland, the space around the gland 8 is filled with a water repellent grease. The bellows 35 are filled with the same grease and fitted in position. The outer and main cylindrical chamber 3 may then be filled with the main mass of grease 33, following which the end plate 14 is secured in position but without the plungers 26 in it. The cylinders 24 are then filled with grease and the plungers 26 are secured in position without the plugs 28 in them and with the central closing plug 19 loosely fitted. Grease is next injected into each of the cylinders 24 behind the plungers through one of the plunger bleed holes 27 until it exudes past the gasket 42, and the remaining bleed holes, thus ensuring that no air is trapped among the grease. The piston plugs 28 are then fitted in position and the closing plug 19 tightened.

The flexible protective cover 38 is next secured in position with water repellent grease between it and the plungers 26 to prevent matter from, say the sea bed, entering the plungers 26 and causing them to jam. Once the repeater is in position on the sea bed and the plungers 26 have taken a more or less permanent position in the cylinders 24 the flexible protective cover 38 may be dispensible and may through corrosive action, etc. from the sea gradually disintegrate.

The displacement of the plungers 26 should be greater than their displacement due to water pressure so that if one of the cylinders ceases to function the other cylinders may balance the pressure.

The piston plugs 28 may be secured in position in such a manner to act as pressure safety valves should the inner perssure exceed the outer pressure when the repeater is being raised from the sea bed.

The pressure transmitted through the grease forces the gland 8 toward the bulkhead so as to press the inwardly facing seating surface or face of the gland against the bulkhead part 11, thereby improving the seal between the gland and the bulkhead.

In the embodiment shown in Figure 3B, the counterbore 1 is threaded as at 57 to receive a retaining ring 57', this retaining ring serving as a means by which a pressure responsive element consisting of a flexible closure diaphragm 58 is secured in the outer end of the outer chamber 3.

It will be appreciated that this diaphragm replaces the piston element or elements shown respectively in Figures 1 and 2.

The flexible diaphragm 58 may be formed of natural or synthetic rubber or consist of a thin metal disc. Satisfactory results have been obtained using a composite diaphragm of metal and plastic sheet, e.g. woven or sheet metal diaphragms interleaved with natural or synthetic rubber or plastic. A three layer construction consisting of a metal diaphragm sandwiched between plastic layers is preferred. The several layers may be bonded or pressed together.

The diaphragm 58 has a central aperture 59 which is clamped against a threaded boss 50 on the end of the cap element 9 by a screwed retaining ring 51. Grease filling holes 64 are provided in the wall of the casing H and are screwed to receive plugs 65.

When assembling the gland joint, the inner chamber provided by cap element 9 is first filled with a water repellent grease which is not harmful to the material of gland 8 and which may not have a viscosity suitable for use with the pressure responsive diaphragm 58. The cap element 9 is next assembled with O ring 13' loosely held in position by a ring 63. All but one of the bellows 35' are filled with grease and assembled. Grease is then injected through the remaining hole 32 until it exudes past the O ring 13. The ring 63 is then tightened to secure O ring 13' and the remaining bellows 35' is filled with grease and assembled.

The outer chambers 3, 66 is now packed with suitable water repellent grease, the holes 64 being left open, and before the flexible diaphragm 58 is in position. The flexible diaphragm 58 is then assembled and further grease exudes from the other filling holes 64 and, the diaphragm is fully extended by the grease. The plugs 65 are then inserted in the holes.

The flexible diaphragm is suitably shaped to allow for the compression of the grease due to head of water without bursting under operating conditions.

The flexible diaphragm may be reinforced with natural or synthetic fibres which may be stranded, woven fabric or slivers and which are embedded in the natural or synthetic rubber of which the diaphragm is made. The preferred material for the flexible diaphragm when not formed of metal is non-migratory polyvinyl chloride resin. Suitable repellent compounds may be included in the flexible diaphragm material to repel the attacks of say teredo worms.

The pressure transmitted through the grease forces the gland 8 toward the bulkhead so as to press the inwardly facing seating surface or face of the gland against the bulkhead part 11, thereby improving the seal between the gland and the bulkhead.

In a modified form the flexible diaphragm 58 may not totally enclose the end of the bulkhead chamber 66 but may replace the wall of the inner chamber 9 within which the cable entry gland is encased.

One such arrangement is shown in Figure 4 wherein in place of the cap element 9 encasing the cable entry gland 8, there is attached to the spigot 11 forming part of the bulkhead B a flexible cap or closure member 70, the interior of which serves as an outer chamber filled with water repellent grease, which is not harmful to that of the gland 8.

The cap member 70 may consist of a bag of synthetic rubber or plastic which is fitted at its open end to the spigot 11 in a water-tight manner. In the embodiment shown the spigot 11 is formed with an annular groove 11' to accommodate the thickness of the bag together with a clamping ring or binding 71 where the inherent resiliency of the bag is not sufficient to hold it in position. At its outer end the bag 70 tapers to a diameter so that it fits closely against the insulation of the cable C.

In practice the bag is attached to the spigot 11 following which an injection nozzle is inserted at the narrow end and sufficient grease injected completely to fill the cavity or outer chamber and so as to expel all air therefrom. If necessary a nose clip 72 is fitted to ensure a water-tight joint against the cable.

In the alternative arrangement shown in Figure 5 the cable entry gland 8 is enclosed within an outer chamber comprising a base ring 73, which is screwed internally to fit the threaded end 10 of the spigot 11 of the bulkhead B, the ring 73 having a reduced end 74 to receive a flexible membrane or closure cap 75 which is formed of synthetic rubber or plastic, being bonded to the metal ring 73. Surrounding the cable C is a collar 76 having a reduced portion 77 over which the membrane 75 is secured and if necessary also bonded thereto. The collar 76 has a screwed recess 78 for a sealing ring 79 and a screwed end plug 80.

The interior of the membrane 75 is filled through a side hole 81 in the base ring 73, the interior air escaping past the cable entry passage in the ring 76. When the membrane 75 is completely filled with grease, the sealing ring 79 is fitted and retained in position by the end plug 80. The filling hole 81 is now closed by a screw plug 82.

Figure 6 shows an arrangement similar to that of Figure 5 in which a locking ring 73 is screwed on to the spigot 11 but in this case the closure diaphragm 75 is replaced by a metal, rubber or plastic bellows 83 which is united at one end to the ring 73 and at its other end to a collar piece 84 to provide an outer chamber. The steps of filling, air bleeding and cable end sealing are similar to those used in the case of the membrane 75 of Figure 5.

In the arrangement shown in Figures 4, 5 and 6 where the repeater gland 8 is encased in a central chamber formed of flexible material, e.g. rubber, plastic or a metal bellows, the exterior of the chamber is subjected directly to the sea water. In each of the constructions shown in Figures 4, 5 and 6, the pressure transmitted through the grease forces the gland 8 toward the bulkhead so as to press the inwardly facing seating surface or face of the gland against the bulkhead part 11, thereby improving the seal between the gland and the bulkhead.

What is claimed is:
1. A submarine cable structure comprising a casing having an inner bore, locating means in said bore, and an apertured bulkhead held in position within said bore by said locating means to provide the end wall of an interior chamber for receiving electrical apparatus; a submarine cable extending into said interior chamber through the aperture in said bulkhead; a cable entry gland located outside said interior chamber and through which said cable extends; a seating face on said gland engaging the exterior surface of said bulkhead around said aperture; a cylindrical element providing an inner chamber enclosing said gland exteriorly of said bulkhead and aligned with the bulkhead aperture for the cable to extend therethrough; means providing an outer chamber enclosing said cylindrical element and having an outer closure comprising pressure responsive means subject to pressure outside the casing, said cylindrical element having means providing for transmission of pressure between said inner chamber and said outer chamber; and water-repellent grease material filling said outer and inner chambers, said pressure responsive means being operable by exterior pressure at ocean depth for transmitting pressure through said grease material from said outer chamber into said inner chamber and onto said gland to press the latter against said bulkhead and thereby to improve the seal between the gland and the bulkhead.

2. A submarine cable housing according to claim 1 wherein the pressure responsive means comprises a diaphragm made from material selected from the group consisting of metal sheet, composite structural material of metal and synthetic plastic material, and non-migratory polyvinylchloride resin.

3. A submarine cable structure according to claim 1 wherein the bulkhead is formed with a central spigot on its outer side, the aperture in the bulkhead through which the cable is led extending through the spigot and the gland seating against the outer end face of the spigot, and wherein the cylindrical element comprises a cap mounted on said spigot and providing therewith the inner chamber for grease material, said cap having an aperture in the wall thereof to permit the pressures in said inner and outer chambers to be equalized, the pressure responsive means comprising a diaphragm of annular shape and secured at its inner periphery to said cap element.

4. A submarine cable structure according to claim 3 comprising a bellows covering the aperture in the cap to prevent passage of grease material therethrough.

References Cited in the file of this patent
UNITED STATES PATENTS

| | | |
|---|---|---|
| 2,509,524 | Pouzef | May 30, 1950 |
| 2,539,310 | Martin | Jan. 23, 1951 |
| 2,697,739 | Presswell | Dec. 21, 1954 |
| 2,782,249 | Martin | Feb. 19, 1957 |